Patented May 4, 1937

2,079,443

UNITED STATES PATENT OFFICE 2,079,443

PROCESS OF TREATING OIL

Stewart C. Fulton, Elizabeth, N. J., assignor to Standard Oil Development Company, a corporation of Delaware No Drawing. Application December 30, 1933, Serial No. 704,757

10 Claims. (Cl. 196—40)

This invention relates to an improved method for treating oils, particularly hydrocarbon oils, and for obtaining improved products therefrom. It relates more particularly to an improved method for preparing sulfuric acid derivatives of olefinic hydrocarbons and other unsaturated organic compounds.

It is already known to treat hydrocarbon oils such as crude petroleum and fractions thereof obtained by distillation, extraction, cracking and other processes with concentrated or fuming sulfuric acid or with sulfuric anhydride. An improved method for treating and refining such oils and for preparing improved sulfuric acid derivatives from unsaturated organic compounds generally has now been found. According to this invention the oil or other unsaturated organic compound is agitated with a mild sulfuric reagent, such as strong or mildly fuming sulfuric acid, and the reactivity of the sulfuric reagent is slowly increased during the agitation. This may be accomplished by slowly adding a highly reactive sulfuric reagent, such as sulfuric anhydride, or highly fuming sulfuric acid during the agitation. By this method, polymerization of highly reactive constituents of the oil, and the formation of objectionable color bodies and sludge, is greatly decreased, and in many instances is even substantially completely prevented.

A mild sulfuric reagent, for the purpose of this invention, is one which causes no objectionable discoloration or polymerization on contact with the oil at the treating temperature. The permissible strength of this reagent obviously varies with the temperature of treatment and the reactivity of the stocks treated. For example, cracked paraffin wax obtained by an atmospheric pressure cracking distillation may be treated initially with sulfuric acid containing up to 20 or 30% sulfuric anhydride at temperatures up to about 60° or 70° F. More reactive stocks require weaker acid or lower treating temperatures, or both. After their initial contact with the mild sulfuric reagent, its strength is gradually increased by the addition of a highly reactive sulfuric reagent until the amount and concentration of acid and anhydride is sufficient to complete the reaction to the extent desired. Where highly refined oils or a high yield of sulfuric acid derivatives is desired, the sulfuric reagents may be added even in large excess.

The highly reactive sulfuric reagent, for the purpose of this invention, is one which would cause substantial polymerization and discoloration on contact with the untreated stock at the treating temperature. Sulfuric anhydride, or fuming sulfuric acid containing above about 40% to 60% or 70% sulfuric anhydride, will ordinarily meet these requirements. The amounts of the mild sulfuric reagent and the highly reactive sulfuric reagent will be so adjusted that the amounts of both sulfuric acid and sulfuric anhydride are those desired at the final treating condition. For example, if the first treatment is conducted with sulfuric acid of a lower strength than concentrated, additional sulfuric anhydride must be added in the second stage of the treatment to bring the previously added acid up to 100% strength before the sulfuric anhydride becomes an effective reagent. It has been found that this distribution of the reagent accomplishes far superior results to that obtained by adding the average concentration of the two reagents to the oil in a single treatment. The initial treatment may be performed with about 10% to 100% of the total sulfuric acid, the remainder being added as a part of the more highly reactive sulfuric reagent in the second steps. Ordinarily about 25% or more of the sulfuric acid is used in the initial step.

Suitable methods for conducting this invention and some of the advantages obtained thereby are illustrated in the following examples:

Example 1.—A cracked fraction of a crude scale petroleum wax obtained as a distillate between 400 and 600° F. (vapor temperature) in an atmospheric pressure cracking distillation has an olefine content of approximately 34%, consisting of olefines of about 180 average molecular weight. 750 parts by weight of this distillate is cooled to about 50° to 70° F. in an agitator provided with inlets for fuming sulfuric acid and sulfuric anhydride. 200 parts of fuming acid (20% sulfuric anhydride) is then added slowly during agitation and cooling in order to avoid a rise in temperature above about 70° F. When the addition of the acid is completed 70 parts of commercially pure sulfuric anhydride is then added slowly, with continued agitation and cooling as before. The reaction mixture is then neutralized at the same temperature with a 20% aqueous solution of sodium hydroxide in slight excess and then carbon dioxide is forced through the mixture is remove excess caustic soda. There results from this treatment a mixture of unreacted hydrocarbons, inorganic salts and soap, which consists largely of sodium alkyl sulfates of the cracked wax olefines.

The resulting mixture is then agitated with about one-third volume of 90% isopropyl alcohol. On being allowed to stand, the mixture separates into three layers, an upper oil layer containing the bulk of the unreacted hydrocarbons with some soap, a middle alcoholic layer containing most of the soap dissolved therein, and a bottom layer consisting of an aqueous solution of the inorganic salts.

The middle and top layers are separately withdrawn; the soap is extracted from the top layer with 50% aqueous isopropyl alcohol and the extract is added to the middle layer. The total alcohol solution is then evaporated to dryness, preferably at as low a temperature as possible, and there is recovered as a residue 180 parts by weight of a pure sodium soap of the sulfated olefines. This corresponds to a conversion to soaps of about 50% of the olefines present in the feed.

*Example 2.*—An equal portion of the same cracked wax fraction used in Example 1 was treated with fuming acid in the same proportions and manner described in that example. 69 parts by weight of sodium soap are then obtained from this reaction mixture by neutralization and extraction, as described above. This corresponds to a conversion to soap of only 24% of the olefines present.

It is necessary to re-treat in a similar manner the oil recovered in Example 2 four times with additional fuming acid in order to obtain a total olefine conversion of 50%.

*Example 3.*—A similar fraction of cracked wax, as used in the above examples, is agitated in a similar manner with sulfuric anhydride. A dark colored granular sludge is thus obtained which yields very small amounts of a sulfonate product of such inferior soap-like qualities that it is unsuited for use either as a detergent or wetting agent.

The soap obtained according to this invention, for example as described in Example 1 above, has highly effective wetting and detergent properties and may be used generally for laundry purposes, as a scouring agent, a wetting agent, and in dye baths. In comparative wetting tests, it is twice as effective in rate of wetting as the sodium salt of sulfated lauryl alcohol. Its effectiveness is not impaired when used in hard water or in acid, neutral or alkaline dye baths. For example, a laundering solution containing 0.1 to 0.3% of a soap composition consisting of equal parts by weight of this improved soap and an inorganic salt such as sodium sulfate or magnesium sulfate in hard water is at least equal to the best commercially available sulfated fatty alcohol preparations and fatty acid soaps in cleaning soiled wools and silks. It may also be used in soap powders and admixed with alkaline agents such as washing soda and with water soluble salts of suitable alkaline metals such as sodium, potassium, magnesium, and the like.

Highly effective soaps may be obtained in improved yields by the application of this invention to olefinic compounds generally, such as those obtained by cracking hydrocarbon oils, and particularly by cracking paraffins such as paraffinic oils, petrolatum and paraffin wax in liquid or vapor phase. The cracking operation is preferably conducted under suitable reaction conditions of temperature, pressure and time, to avoid any substantial polymerization of the reaction products. The resulting olefines preferred for the preparation of soaps of high quality are those having 8 or more carbon atoms and in which the carbon atoms are preferably connected in a straight chain. Improved soaps may be prepared according to the present invention by sulfating olefines of 8, 10, 12 and 20 or even 30 or more carbon atoms. Such olefines may also be obtained by dehydration of fatty alcohols, dehydrogenation of paraffins, dehydration or deoxidation of oxygenated paraffins and from chlor paraffins and the like. Other olefinic compounds may also be sulfated and used to prepare improved soaps by the herein described process. Such olefinic compounds include the unsaturated alkyl alcohols, fatty acids, esters and the like. The soaps may also be prepared by neutralizing the olefine sulfate with other suitable inorganic and organic basic elements or groups, such as the alkali and alkaline earth metals and other metals forming water dispersible soaps, ammonium, the amines, alkylamines, alkylolamines and the like.

In the application of this process to the sulfation of olefines for the preparation of high quality soaps, it is preferred to use at least one molal equivalent of sulfuric acid to the olefines treated. Sufficient sulfuric anhydride, in the free state or dissolved in part of the sulfuric acid, will be used to obtain a substantially complete reaction at the temperature used. It is also preferred to remove the excess sulfuric anhydride, after the reaction, at a temperature not higher than that used in the sulfating reaction. This may be accomplished by dilution with water or by neutralization with suitable bases, with accompanying cooling. The preferred range of temperature for the acid treating is from −20° F. to about 70° F., although higher temperatures may be used, as in ordinary oil refining, where the quality of the sulfuric acid derivatives is of little importance. The best quality soaps, with the minimum of color, are usually obtained at reaction temperatures of about −10° F. to 20° F. Since the acid is normally solid at these temperatures, it should be added slowly, with vigorous agitation to ensure its distribution throughout the oil in as finely divided a form as possible.

While the preparation of improved soaps is one object of this invention, the invention is not to be limited only to the treatment of materials containing olefinic compounds suitable for the preparation of such improved soaps, but is also applicable as an improved and economical method of refining hydrocarbon oils generally. This invention may be used, for example, for the refining of viscous white oil and burning oil stocks to prepare improved colorless and odorless medicinal oils and lamp oils. In such treatments the first acid added may be of lesser strength than fuming, and treating temperatures even above atmospheric, for example, of 100 to 150° F. or even higher may be used. It may also be used to advantage in all refining processes where fuming sulfuric acid or sulfuric anhydride is now employed.

Where sulfuric acid derivatives of especially high purity and light color are desired, the initial materials may be subjected to a preliminary treatment with a small amount of concentrated or fuming acid to remove asphaltic and pitchy material and highly reactive resin-forming constituents. The resulting acid sludge thus obtained is removed before treating the oils with additional acid and sulfuric anhydride as described herein.

Improved soaps may also be obtained by the use of sulfuric acid of any desired initial strength instead of the fuming acid used in Example 1.

It will be understood that when more dilute acid is used proportionately larger amounts of sulfuric anhydride will be required to obtain the final concentration desired for reaction with the material being treated.

This invention is not to be limited to any theoretical explanations or examples which are presented herein solely for purposes of illustration, but only by the following claims in which it is desired to claim all novelty insofar as the prior art permits.

I claim:

1. The two-step process of treating oils which comprises agitating in the first step an acid reactive hydrocarbon oil with a sulfuric acid reagent ranging from concentrated sulfuric acid to fuming sulfuric acid containing not more than 30% sulfuric anhydride, at a temperature between the approximate limits of $-20°$ F. and 150° F., the strength of the reagent used being selected according to the temperature of treatment and the reactivity of the hydrocarbon oil treated so as to cause no objectionable discoloration or polymerization on contact with the oil at the treating temperature, and then, while continuing the agitation, slowly adding, in a second step, to the total reaction mixture of the first step, a sulfuric acid reagent ranging from 40% fuming sulfuric acid to sulfuric anhydride, the initial treatment being performed with about 10% to 100% of the total sulfuric acid used.

2. Process according to claim 1, carried out at a temperature between the approximate limits of $-20°$ F. and 70° F.

3. Process according to claim 1, carried out at a temperature between the approximate limits of $-10°$ F. and 20° F.

4. Process according to claim 1, in which the oil treated comprises olefinic hydrocarbons of not less than 8 carbon atoms.

5. Process according to claim 1, in which the oil treated comprises cracked paraffin wax.

6. Process according to claim 1, in which the reagent added in the second step is sulfuric anhydride.

7. Process according to claim 1, in which the reaction liquid is neutralized with a soap-forming base and the reaction products are separated.

8. The process which comprises agitating an olefinic oil prepared by atmospheric pressure cracking distillation of paraffin wax with fuming sulfuric acid containing about 20% sulfuric anhydride at a temperature between the approximate limits of 50° and 70° F. and, while continuing the agitation, slowly increasing the reactivity of said reagent by addition of sulfuric anhydride.

9. The process which comprises adding to about 750 parts by weight of a cracked wax distillate containing about 30 to 40% of olefines having an average molecular weight of about 180 with agitation about 200 parts of fuming sulfuric acid containing about 20% sulfuric anhydried at a temperature between the approximate limits of 50° and 70° F., cooling the reaction liquid, if necessary, to prevent rise of temperature above the approximate limit specified and then while continuing the agitation slowly adding about 70 parts of sulfuric anhydride.

10. Process according to claim 9, in which the reaction liquid is neutralized with an aqueous solution of alkali and the reaction products are separated.

STEWART C. FULTON.